United States Patent [19]

Deutschmann

[11] Patent Number: 5,020,482
[45] Date of Patent: Jun. 4, 1991

[54] DEVICE FOR COOLING A CHARGED PISTON INTERNAL-COMBUSTION ENGINE

[75] Inventor: Herbert Deutschmann, Friedrichshafen, Fed. Rep. of Germany

[73] Assignee: MTU Friedrichshafen, Friedrichshafen, Fed. Rep. of Germany

[21] Appl. No.: 490,687
[22] PCT Filed: Jun. 23, 1989
[86] PCT No.: PCT/DE89/00417
  § 371 Date: Mar. 19, 1990
  § 102(e) Date: Mar. 19, 1990
[87] PCT Pub. No.: WO90/01111
  PCT Pub. Date: Feb. 8, 1990

[30] Foreign Application Priority Data

Jul. 19, 1988 [DE] Fed. Rep. of Germany ....... 3824412

[51] Int. Cl.$^5$ .............................................. F01P 3/00
[52] U.S. Cl. ................... 123/41.29; 123/41.09
[58] Field of Search ............ 123/41.08, 41.09, 41.29, 123/41.31, 563; 60/599

[56] References Cited

U.S. PATENT DOCUMENTS

| 3,863,612 | 2/1975 | Wiener | 123/41.08 |
| 4,180,032 | 12/1979 | Plegat | 123/563 |
| 4,621,594 | 11/1986 | Kubis | 123/41.29 |

FOREIGN PATENT DOCUMENTS

| 2120790 | 12/1971 | Fed. Rep. of Germany . |
| 2527872 | 8/1983 | Fed. Rep. of Germany . |
| 3226883 | 8/1983 | Fed. Rep. of Germany . |
| 3708351 | 6/1988 | Fed. Rep. of Germany . |
| 2341041 | 9/1977 | France . |
| 2178157 | 2/1987 | United Kingdom . |

Primary Examiner—Noah P. Kamen
Attorney, Agent, or Firm—Barnes & Thornburg

[57] ABSTRACT

The device has one circulating-system branch respectively for the charge air cooling, the engine cooling and the coolant recooling. Using a change-over device, the circulating-system branches are connected to form a common coolant circulating system. The change-over device can be controlled as a function of the coolant temperature and the charge air pressure and, according to the respective operating requirement, controls the coolant throughput in the circulating-system branches.

3 Claims, 1 Drawing Sheet

DEVICE FOR COOLING A CHARGED PISTON INTERNAL-COMBUSTION ENGINE

BACKGROUND AND SUMMARY OF THE INVENTION

The present invention generally relates to a device for cooling a charged piston internal combustion engine having charge air cooling and a coolant recooler, and more particularly to a device which ensures an operation of the piston internal combustion engine which is free of disturbances in the case of alternating loads and environmental conditions.

A device of this type is disclosed by German Patent Application (DE) 21 20 790 B2 which has separate coolant circulating systems for the charge air cooling and for the engine cooling. As a result, the temperatures in the two circulating systems may be selected to differ corresponding to the component requirements without being influenced by one another. However, this object is achieved by additional expenditures with respect to components. Thus, subassemblies, such as a safety device, a control device, a coolant pump, an expansion tank, a filler neck, must be present in both coolant circulating systems and therefore exist twice. These additional components increase the weight, the overall size and the costs of a correspondingly equipped piston internal combustion engine. In addition, the coolant circulating system for the charge air cooling, which is divided into two parallel separately controllable lines between the circulating pump and the charge air cooler, also leads to double expenditures. The control valve of one line is temperature-controlled, and the control valve of the other line is controlled as a function of the charge air pressure.

Therefore, it is an object of the invention to provide a device for the cooling of a charged piston internal combustion engine which, with low expenditures with respect to parts for the device, permits a cooling in all operating ranges which is adapted to the requirements of the components of the piston internal combustion engine.

Advantages achieved by preferred embodiments of the present invention include, in particular, that expenditures with respect to parts for the device are reduced in comparison to the disclosed arrangement, that, despite the mutually communicating circulating-system branches, the lowering of the charge air temperature to the minimum permitted by the coolant recooler is possible without any restriction as a result of the minimum temperature of the coolant at the inlet into the piston internal combustion engine, and that, as a result of the overcontrolling of the change-over device which is a function of the charge air pressure, a control of the coolant circulating system is provided which reacts rapidly to a load increase of the piston internal combustion engine.

Other objects, advantages and novel features of the present invention will become apparent from the following detailed description of the invention when considered in conjunction with the accompanying drawings.

DETAILED DESCRIPTION OF THE DRAWINGS

Figure 1:
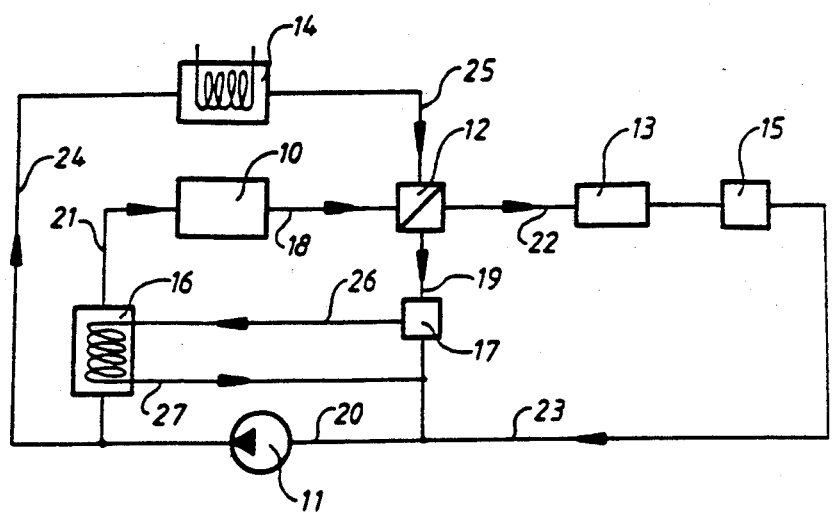
FIG. 1 is a schematic representation of the coolant circulating system of a charged piston internal combustion engine according to one embodiment of the present invention.

An embodiment of the invention is depicted in the drawings and described below.

An arrangement for the cooling of a charged piston internal combustion engine 10 has a closed coolant circulating system comprising three circulating-system branches with a common coolant pump 11. The circulating-system branch for the engine cooling comprises the coolant outlet pipe 18 of the piston internal combustion engine 10, the charge air cooler bypass pipe 19, the coolant pump pipe 20 and the coolant inlet pipe 21 of the piston internal combustion engine 10. The second circulating-system branch, which is used for the cooling of charge air, comprises the coolant inlet pipe 22 of the charge air cooler or intercoder 13 as well as the coolant outlet pipe 23 which is connected with th coolant pump pipe 20 and the charge air cooler bypass pipe 19 and into which an oil cooler 15 is also inserted. The third circulating-system branch comprises a coolant recooler HX, Rod 14 operated by cold external water, a coolant inlet pipe 24 originating from the coolant pump pipe 20, and a coolant outlet pipe 25 of the coolant recooler 14.

The three circulating-system branches are controlled by a change-over device 12 which connects the coolant outlet pipe 18 of the piston internal combustion engine 10, the charge air cooler bypass pipe 19, the coolant inlet pipe 22 of the charge air cooler 13 and the coolant outlet pipe 25 of the coolant recooler 14 with one another.

The coolant inlet pipe 21 of the piston internal combustion engine 10 is guided through a heat exchanger 16 which, by way of an inlet pipe 26, is connected with a thermostat valve 17 arranged in the charge air cooler bypass pipe 19.

The outlet pipe 27 of the heat exchanger 16 is connected to the charge air cooler bypass pipe 19 downstream of the thermostat valve 17.

Figure 2:
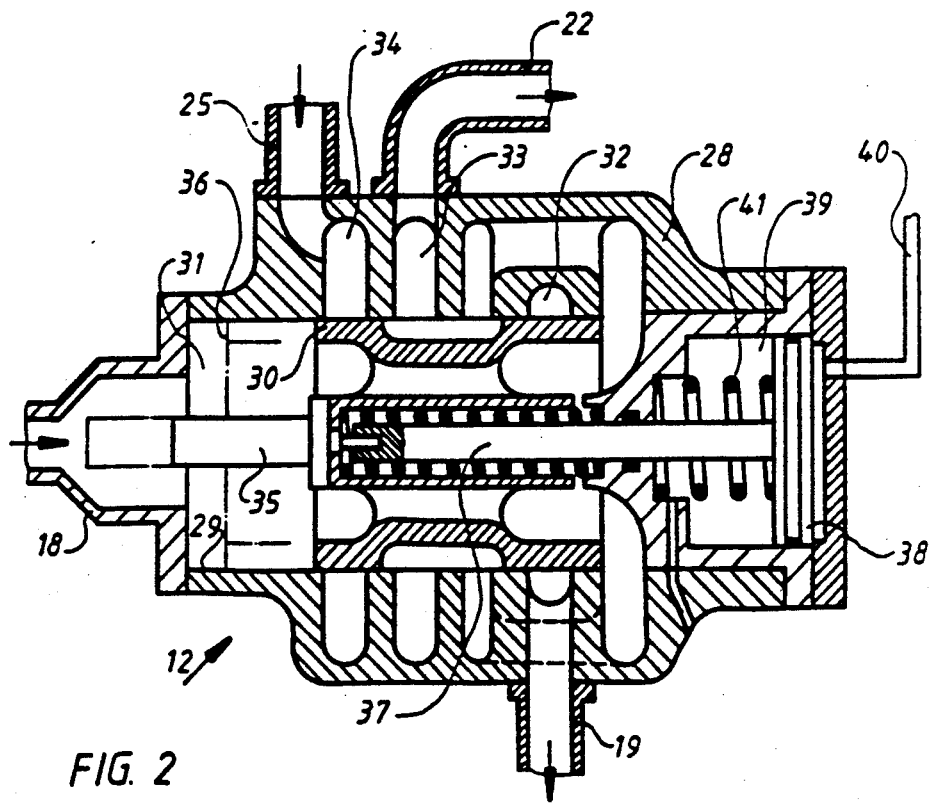
FIG. 2 is a view of a change-over device according to one embodiment of the present invention.

The change-over device 12, shown in FIG. 2, comprises a housing 28 with connections for the coolant pipes 18, 19, 22, 25 of the three circulating-system branches and a slide 30 which can be adjusted in a bore 29. The position of the slide 30, controls each of the control chambers 31, 32, 33, 34 which are respectively assigned to one of each of the coolant pipes 18, 19, 22, 25. By a temperature-sensitive element 35, which is arranged in the control chamber 31 for the coolant outlet pipe 18 of the piston internal combustion engine 10 and is connected with the slide 30, the slide 30 can be adjusted as a function of the coolant temperature of the piston internal combustion engine 10.

The position of the slide 30 shown in FIG. 2 corresponds to the condition during stoppage of the piston internal combustion engine 10 as well as during partial load and a low ambient temperature. The third circulating-system branch to the coolant recooler 14 and the charge air cooler bypass pipe 19 will then be blocked with the slide 30 positioned as shown in FIG. 2. In this case, the waste heat of the piston internal combustion engine 10 is conveyed to the charge air in the charge air cooler 13. Thus, a desirably high charge air temperature is obtained while the partial load is low.

During full load of the piston internal combustion engine 10, when the coolant in the coolant outlet pipe 18 has reached the highest temperature, the slide 30 takes up position 36 which is indicated by a dash-dotted line. The arrangement of the coolant flow for this position will be discussed below.

The temperature-sensitive element 35 supports itself at the piston rod 37 of a piston 38 which can be slid in a cylinder 39 and which, by way of a pipe 40, can be acted upon by charge air pressure of the piston internal combustion engine 10.

During idling and low partial load, when no significant charge air pressure exists in the piston internal combustion engine 10, the slide 30, controlled by the temperature-sensitive element 35, takes up an intermediate position in which the whole amount of coolant coming from the piston internal combustion engine 10 is guided through the charge air cooler 13. In the change-over device 12, a small amount of coolant coming from the coolant recooler 14 is added to the coolant coming from the engine 10 so that a coolant temperature of the coolant outlet pipe 18 of the piston internal combustion engine 10 is obtained which is at the permissible upper limit, and the charge air temperature, upstream from the charge air cooler 13 is raised with respect to the full-load operation.

The charge air pressure rises with an increasing load of the piston internal combustion engine 10. As a result of the charge air pressure existing at the piston 38, the slide 30, when a counterforce is exceeded which is adjusted by the pressure spring 41, is shifted irrespective of the temperature-sensitive element 35. As a result, the control range of the change-over device 12 shifts into a temperature range which, without any influencing of the charge air pressure, would be reached only at a higher temperature level of the coolant of the piston internal combustion engine 10 (see position 36 of slide 30). The charge air cooling is intensified in that a fairly large amount of the cold coolant coming from the coolant recooler 14 is added to the coolant reaching the charge air cooler 13. At the same time, uncooled coolant from control chamber 31 arrives in control chamber 32 and thus is shunted to the charge air cooler bypass pipe 19.

The mixing of the coolant flows from the charge air cooler bypass pipe 19 and from the charge air cooler outlet pipe 23 raises the temperature of the coolant upstream from the coolant pump 11. If, nevertheless, the coolant temperature in the coolant inlet pipe 21 of the piston internal combustion engine 10 becomes too low, the thermostat valve 17 will respond. The heat exchanger 16 is then acted upon by uncooled coolant from the charge air cooler bypass pipe 19 whereby the coolant temperature is raised in the coolant inlet pipe 21.

In the case of a load increase to high power values of the piston internal combustion engine 10, the charge air pressure will rise more rapidly than the coolant temperature in the coolant outlet pipe 18 of the piston internal combustion engine 10. By using the piston 38, acted upon by the charge air pressure, the lagging temperature-controlled adjustment of the slide 30 is overridden and immediately compensated. The coolant circulating system is therefore already adjusted to the larger amount of waste heat to be expected with the increased power output of the piston internal combustion engine 10, before it is noticeable at the temperature-sensitive element 35. However, at the same time, the maximally possible charge air cooling becomes operative immediately because only cooled coolant from the coolant recooler 14 is supplied to the charge air cooler 13.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A device for cooling a charged piston internal combustion engine equipped with a charge air cooler and a coolant recooler, comprising:
    a closed coolant circulating system having several circulating-system branches with a common coolant pump;
    a change-over device for controlling coolant flow to the several circulating-system branches which selectively connects a coolant outlet pipe of the piston internal combustion engine and a coolant outlet pipe of the coolant recooler with a coolant inlet pipe of the charge air cooler and a charge air cooler bypass pipe; and
    a heat exchanger arranged in a coolant inlet pipe of the piston internal combustion engine which is provided with coolant from the charge air cooler bypass pipe under the control of a thermostat valve.

2. A device for the cooling of a charged piston internal combustion engine according to claim 1, wherein the change-over device has a thermostatic control which at least partially determines the selective connecting.

3. A device for the cooling of a charged piston internal combustion engine according to claim 2, wherein the change-over device has a control device which is acted upon by charge air pressure and which overrides the thermostatic control of the change-over device.

* * * * *